United States Patent
Burba et al.

(10) Patent No.: US 10,587,496 B2
(45) Date of Patent: Mar. 10, 2020

(54) LOCALIZING TRAFFIC USING NETWORK TOPOLOGY

(71) Applicant: Microsoft Technology Licensing, LLC, Redmond, WA (US)

(72) Inventors: Alexander Burba, Seattle, WA (US); Brandon T. Hunt, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 365 days.

(21) Appl. No.: 15/430,176

(22) Filed: Feb. 10, 2017

(65) Prior Publication Data

US 2018/0234332 A1    Aug. 16, 2018

(51) Int. Cl.
*H04L 12/733*    (2013.01)
*H04L 29/08*    (2006.01)
*H04L 12/751*    (2013.01)
*H04L 12/24*    (2006.01)
*H04L 12/26*    (2006.01)

(52) U.S. Cl.
CPC .......... *H04L 45/122* (2013.01); *H04L 41/12* (2013.01); *H04L 43/10* (2013.01); *H04L 45/02* (2013.01); *H04L 67/1042* (2013.01); *H04L 67/1063* (2013.01); *H04L 67/1072* (2013.01)

(58) Field of Classification Search
CPC ....... H04L 45/122; H04L 41/12; H04L 43/10; H04L 45/02
USPC ........................................................ 709/241
See application file for complete search history.

(56) References Cited

U.S. PATENT DOCUMENTS

| | | | |
|---|---|---|---|
| 7,246,148 B1 * | 7/2007 | Phillips | H04L 45/02 709/203 |
| 7,536,467 B2 | 5/2009 | Guo et al. | |
| 8,504,682 B2 | 8/2013 | Steiner et al. | |
| 8,996,723 B2 | 3/2015 | Li et al. | |

(Continued)

FOREIGN PATENT DOCUMENTS

WO    2016008784 A1    1/2016

OTHER PUBLICATIONS

Liu, et al., "Location-Aware Topology Matching in P2P Systems", In Twenty-third Annual Joint Conference of the IEEE Computer and Communications Societies, Mar. 7, 2004, 11 pages.

(Continued)

*Primary Examiner* — Wing F Chan
*Assistant Examiner* — Leon Y Tseng
(74) *Attorney, Agent, or Firm* — Merchant & Gould

(57) ABSTRACT

Localizing network traffic using network topology is provided. A request for content is received from a first peer of a peer-to-peer (P2P) network having a plurality of peers. In response to receiving a request for content, one or more peers to receive the requested content in the P2P network are determined. One or more nodes in a trace route from the first peer to a predetermined address that are common to the trace route from the one or more peers to the predetermined address are determined. The one or more common nodes are ordered by hops from the first peer. At least one peer is selected from the ordered one or more common nodes to recommend to the first peer. The selected at least one peer is recommended to the first peer. The first peer then connects with the recommended at least one peer and receive the content.

19 Claims, 8 Drawing Sheets

(56) References Cited

U.S. PATENT DOCUMENTS

| | | | |
|---|---|---|---|
| 9,021,018 B2 | 4/2015 | Kiesel et al. | |
| 9,313,268 B2 | 4/2016 | Souza et al. | |
| 9,413,846 B2 | 8/2016 | Burba et al. | |
| 2006/0036762 A1* | 2/2006 | Vadlakonda | H04L 45/02 709/238 |
| 2008/0219169 A1 | 9/2008 | Sargor et al. | |
| 2009/0323544 A1 | 12/2009 | Gaddis et al. | |
| 2010/0318668 A1 | 12/2010 | Sylvain | |
| 2011/0282945 A1 | 11/2011 | Thyni et al. | |
| 2012/0093023 A1* | 4/2012 | Ficet | H04L 41/12 370/252 |
| 2014/0164627 A1 | 6/2014 | Burba et al. | |
| 2014/0172972 A1* | 6/2014 | Burba | H04L 67/1063 709/204 |
| 2016/0020956 A1* | 1/2016 | Naiem | H04L 41/12 370/351 |

OTHER PUBLICATIONS

Choffnes, et al., "Taming the Torrent", In Proceedings of the ACM SIGCOMM conference on Data communication, Aug. 17, 2008, pp. 363-374.

Poese et al., "Improving Content Delivery Using Provider-Aided Distance Information", In Proceedings of 10th ACM Special Interest Group on Data Communications Conference on Internet Measurement, Nov. 1, 2010, pp. 22-34.

"International Search Report and Written Opinion Issued in PCT Application No. PCT/US2018/016537", dated May 14, 2018, 13 Pages.

* cited by examiner

MOBILE COMPUTING DEVICE

LOCALIZING TRAFFIC USING NETWORK TOPOLOGY

BACKGROUND

Peer-to-peer (P2P) content distribution includes transfer of content between peers that is from one user computer to another user computer. P2P networks usually include a server which keeps a list of peers which have content downloaded from a distribution server. When a P2P user requests the content from the distribution server, the server may obtain addresses of peers having the desired content. The server replies with a list of addresses to the requesting peer having the content. The requesting peer can communicate with a peer on the list to download the content.

The list of addresses provided by the server can be based on locality, network measurements and the like, and may be based on the viewpoint of the server. However, that much locality information and other operator specific information is not usually available to a central server. The limited knowledge of the network location of the different peers causes the traffic flow to be non-optimal from a network point of view. This puts an unnecessary load on expensive peering connections between Internet Service Providers (ISPs). This also causes longer download times for the end-users.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for localizing traffic using network topology. For example, a request for content may be received from a first peer of a peer-to-peer (P2P) network having a plurality of peers. In response to the request for the content, one or more peers containing the requested content in the P2P network may be determined. One or more nodes in a trace route from the first peer to a content server that are common to the trace route of the one or more peers containing the requested content may be determined. The common nodes may be ordered by a hop distance from the first peer. At least one node may be selected from the ordered one or more nodes. Peers associated with the shortlisted node may be ranked based on their hop distance from the first peer. At least one peer may be selected from the ranked peers to recommend to the first peer. The selected at least one peer may be recommended to the first peer. The first peer then may connect with the recommended peer and exchange the content.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
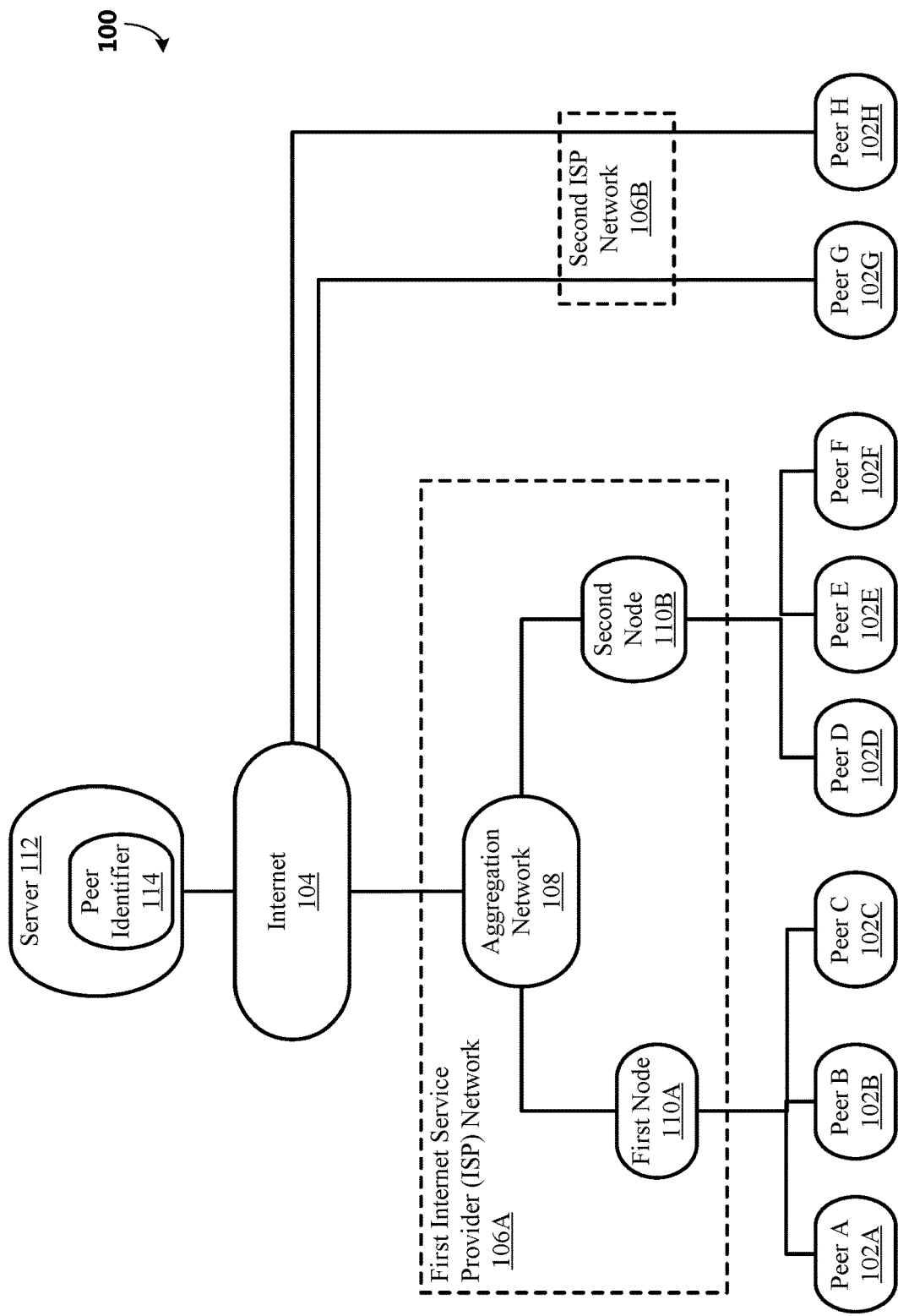
FIG. 1 is a block diagram showing an example operating environment including components of a peer to peer (P2P) network.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for localizing traffic using network topology. In traditional peer to peer (P2P) networks, a peer device is required to connect with other peer devices to facilitate data acquisition. According to aspects, methods and system for selecting optimal peers for data acquisition are provided, where optimal may be defined as beneficial for reducing network interconnectivity problems and congestion, as well as for increasing acquisition speed. Through inspection of devices on network routes, aspects of the present disclosure may generate a network topology, and localize traffic to devices that are close by. Peer devices may report their network nodes from running trace routes. A central service, for example a peer identifier, may collect trace routes data and use those data to select peers by grouping devices that share a common node in the trace routes. Peer selection may further be optimized by ordering multiple peer sources to minimize a number of nodes to be traversed.

For example, a server may receive a request for content from a first peer of a P2P network having multiple peers. In response to the request, the server may determine one or more peers in the P2P network containing the requested content. One or more nodes in a trace route from the first peer to a content server that are common to the trace route of the one or more peers containing the requested content may be determined. The common nodes may be ordered by a hop distance from the first peer. At least one node may be shortlisted from the ordered one or more nodes. Peers associated with the shortlisted node may be ranked based on their hop distance from the first peer. At least one peer may be selected from the ranked peers to recommend to the first peer. The selected at least one peer may be recommended to the first peer. The first peer then may connect with the recommended peer and receive the content.

FIG. 1 is a block diagram showing an example operating environment including components of P2P network 100. The illustrated P2P network 100 may include a plurality of peers 102A-H (collectively peer 102). Peer 102 may participate in the P2P network 100 by providing certain pieces of information. For example, peer 102 may need to agree to share its network addresses and agree to share content stored thereon. Peer 102 may further need to agree to certain terms and conditions of being part of P2P network 100. Each of peers 102A-H may have a user associated with it. Although P2P network 100 is shown to include only eight peers 102, it will be apparent to a person of ordinary skill in the art that the number of participating peers 102 may typically be much higher and may include hundreds and even thousands of peers 102.

Peer 102 may include a P2P application which may be utilized by a user to request content or to connect to other peers 102 in P2P network 100. The P2P application may include a thick client application, which are stored locally on peer 102, or may include thin client applications (i.e., web applications) that reside on a remote server and accessible over a network. A thin client P2P application may be hosted in a browser-controlled environment or coded in a browser-supported language and reliant on a common web browser to render the P2P application executable on peer 102.

Peer 102 may include an electronic computing device. The computing device may be a tablet computing device; however, as should be appreciated, the computing device may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing the P2P application. The hardware of these computing devices is discussed in greater detail in regard to FIGS. 5, 6A, 6B, and 7.

As illustrated in FIG. 1, peers 102A-102F may be customers of first Internet Service Provider (ISP) 106A, whereas peers 102G and 102H may belong to a second ISP 106B. The network of first ISP 106A may include an aggregation network 108 towards the Internet 104 to which peers 102A-102C may be connected via a first node 110A and peers 102D-102F via a second node 110B. First node 110A and second node 110B may be multi-service access nodes (MSAN). While P2P network 100 is shown to include only one node between peers 102A-102F and aggregation network 108, it may be apparent to a person of ordinary skill in the art that there may be more than one node between peers 102A-102F and aggregation network 108.

P2P network 100 may further include a server 112 accessible to peer 102 via the Internet 104. Server 112 may be a content server or a content distribution server. Server 112 may include a peer identifier 114. Peer identifier 114 may be co-located with the content server or may be located on a separate server. In one aspect, peer identifier 114 may be configured to generate a network topology of P2P network 100. As described below, FIG. 2 is a flow chart showing general stages involved in an example method 200 for generating a network topology of a P2P network, for example P2P network 100.

Figure 2:
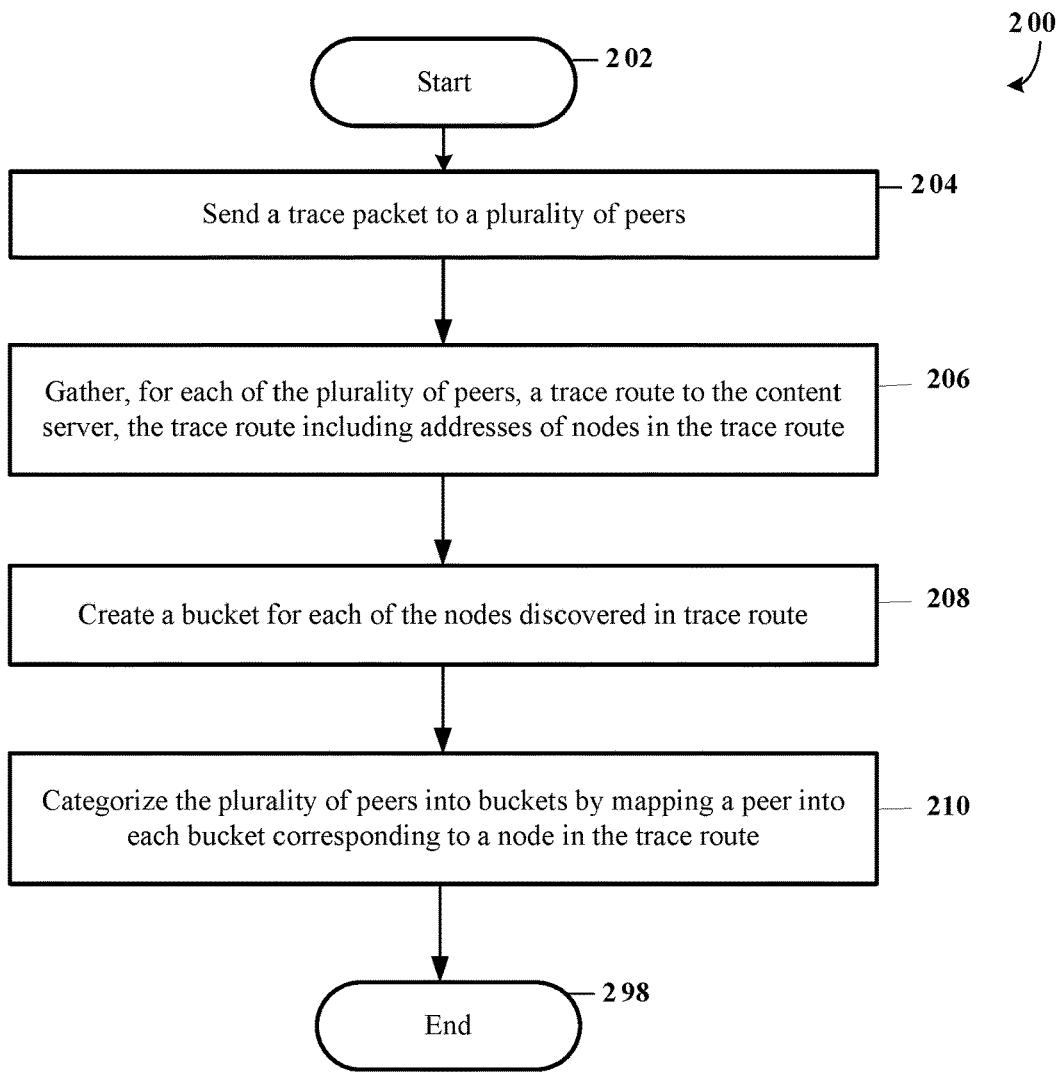
FIG. 2 is a flow chart showing general stages involved in an example method for gathering network topology.

With reference now to FIG. 2, method 200 may begin at start OPERATION 202, and proceed to OPERATION 204, where a trace packet may be sent to peer 102 of P2P network 100. The trace packet may be sent by peer identifier 114 and may travel from server 112 to each of peers 102A-H. The trace packet may be configured to determine a trace route between peer 102 and server 112. For example, the trace packet may determine internet protocol (IP) addresses of nodes in the trace route between peer 102 and server 112. In one aspect, the trace route may be directed to a predetermined address in P2P network 100. The predetermined address may be determined by an administrator of P2P network 100. The trace packet may pass through network nodes such as bridges, routers, and gateways in the trace route. Each time the trace packet passes to a next network node, a hop occurs. The trace packet may further determine a hop distance between the determined nodes. The hop distance may be determined in terms of a hop count or a time taken to travel from one node to another node. In one aspect, the trace packet may originate either at peer identifier 114 or at peer 102. For example, the trace packet may originate at peer 102 and may travel towards server 112. In one aspect, the trace packet may be restricted to not discover any personal identifying information on the trace route.

After sending the trace packet to peer 102 at OPERATION 204, method 200 may proceed to OPERATION 206 where the trace route to content server 112 may be gathered. For example, peer identifier 114 may gather the trace route of each of peers 102A-102F of P2P network 100. Peer identifier 114 may gather the trace route in a database. The gathered trace route may include the IP addresses of the nodes in the trace routes, the hop distance between the nodes, any delay on the nodes, etc. The database containing the gathered trace route may be located at server 112 or at another server accessible to peer identifier 114. Examples of trace routes are illustrated in FIG. 3A.

Figures 3A, 3B:
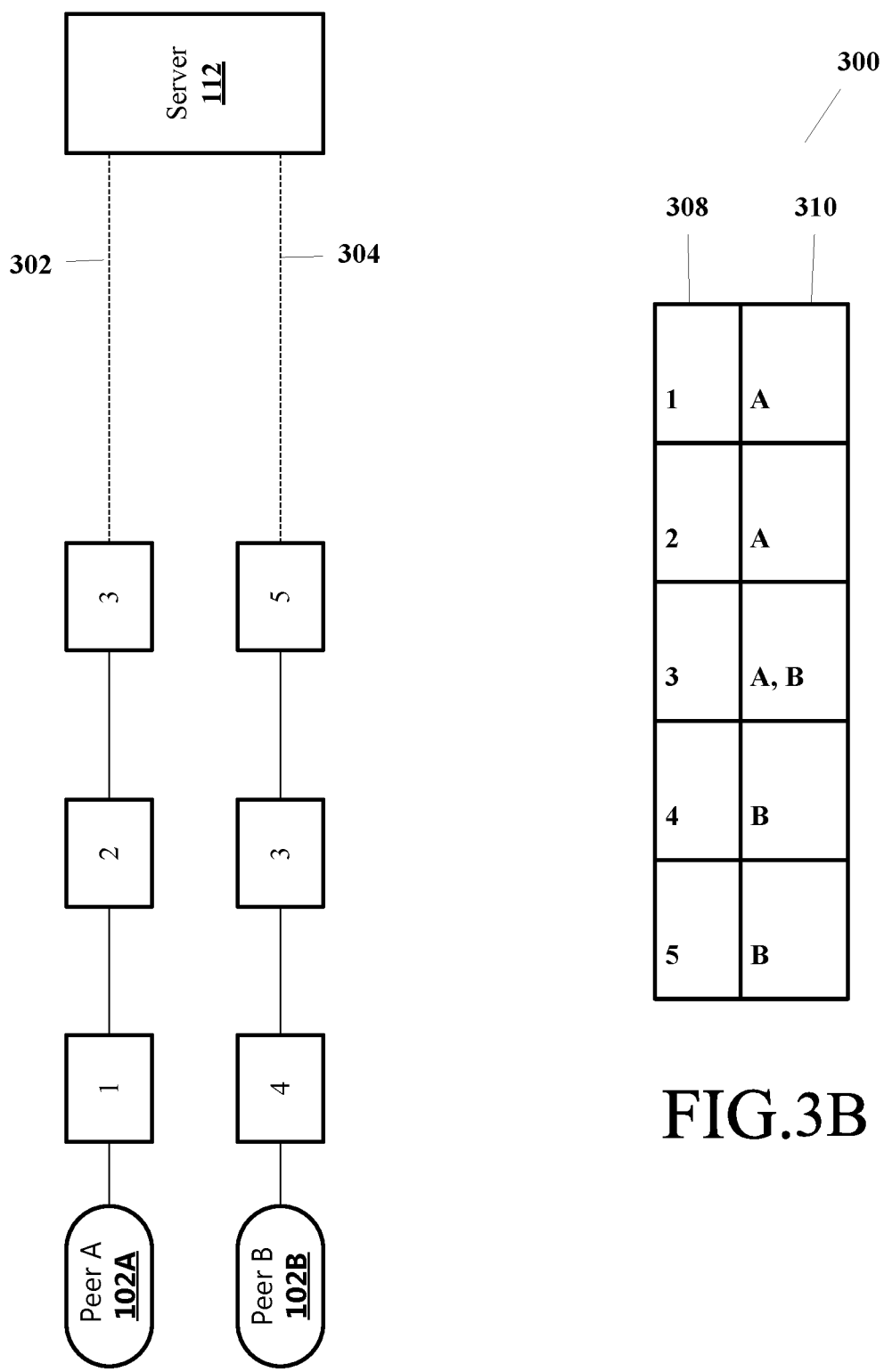
FIG. 3A is an illustration of trace routes in a P2P network.
FIG. 3B is an illustration of network topology of a P2P network.

FIG. 3A illustrates two trace routes 302 and 304. First trace route 302 between Peer A 102A and server 112 may include nodes 1, 2, 3, and so on. Second trace route 304 between Peer B 102B and server 112 may include nodes 4, 3, 5, and so on. As an example, trace routes 302 and 304 may include identifying information, such as IP addresses, of nodes 1, 2, 3, 4, and 5. Trace routes 302 and 304 may further include a hop distance between nodes: Peer A-node 1, node 1-node 2, node 2-node 3; Peer B-node 4, node 4-node 3, and node 3-node 5. In one aspect, the information gathered by the trace packet may be restricted by an administrator. For example, and as illustrated in FIG. 3A, the trace route may only include the identifying information of predetermined number of nodes in the trace route. In another example, the trace route may only be traced to a node which may include a cached copy of content. In yet another example, the trace route may be restricted to not include any personal identifying information.

Once the trace route from peer 102 to server 112 is gathered at OPERATION 206, method 200 may proceed to OPERATION 208 where a bucket (information repository) may be created corresponding to each of the nodes in the gathered trace routes. For example, peer identifier 114 may determine unique nodes in the gathered trace routes and create a bucket for each node. In one aspect, peer identifier 114 may limit a number of buckets. For example, peer identifier 114 may create buckets corresponding to nodes which are at a predetermined hop distance from peers 102. For example, peer identifier 114 may create buckets only corresponding to nodes which are between first and second hop counts (for example, two and five hop counts) away from peer 102. In one aspect, the predetermined hop distance may be defined by an administrator of P2P network 100. After creating buckets at OPERATION 208, method 200 may proceed to OPERATION 210 where a plurality of peers may be categorized into the buckets. For example, peer identifier 114 may identify each peer which is associated with a node. According to aspects, a peer may be associated with a node when that node appears in the trace route from the peer to server 112. When a peer is associated with a particular node, the peer may be categorized in the bucket corresponding to that node. After categorizing the network topology at OPERATION 206, method 200 may end at OPERATION 298. An example of categorized network topology 300 is illustrated in FIG. 3B.

For example, and as illustrated in FIG. 3B, network topology 300 may include a first column 308 corresponding buckets and a second column 310 corresponding to the nodes. First column 308 and second column 310 may each further include a plurality of rows, each row corresponding to a bucket and corresponding nodes of the bucket. For example, and as illustrated in FIG. 3B, network topology may include buckets 1, 2, 3, 4, and 5 corresponding to the nodes 1, 2, 3, 4, and 5 contained in trace routes 302 and 304. As further illustrated in FIG. 3B, peer A may be categorized in buckets 1, 2, and 3 and peer B may be categorized in buckets 3, 4, and 5. In one aspect, information stored in network topology 300 may be anonymized. For example, any personal identifying information may be removed from network topology 300. Although the network topology 300 is shown in FIG. 3B in a tabular format, it should be apparent to a person of ordinary skill in the art that network topology 300 may be categorized in other data formats.

Figure 4:
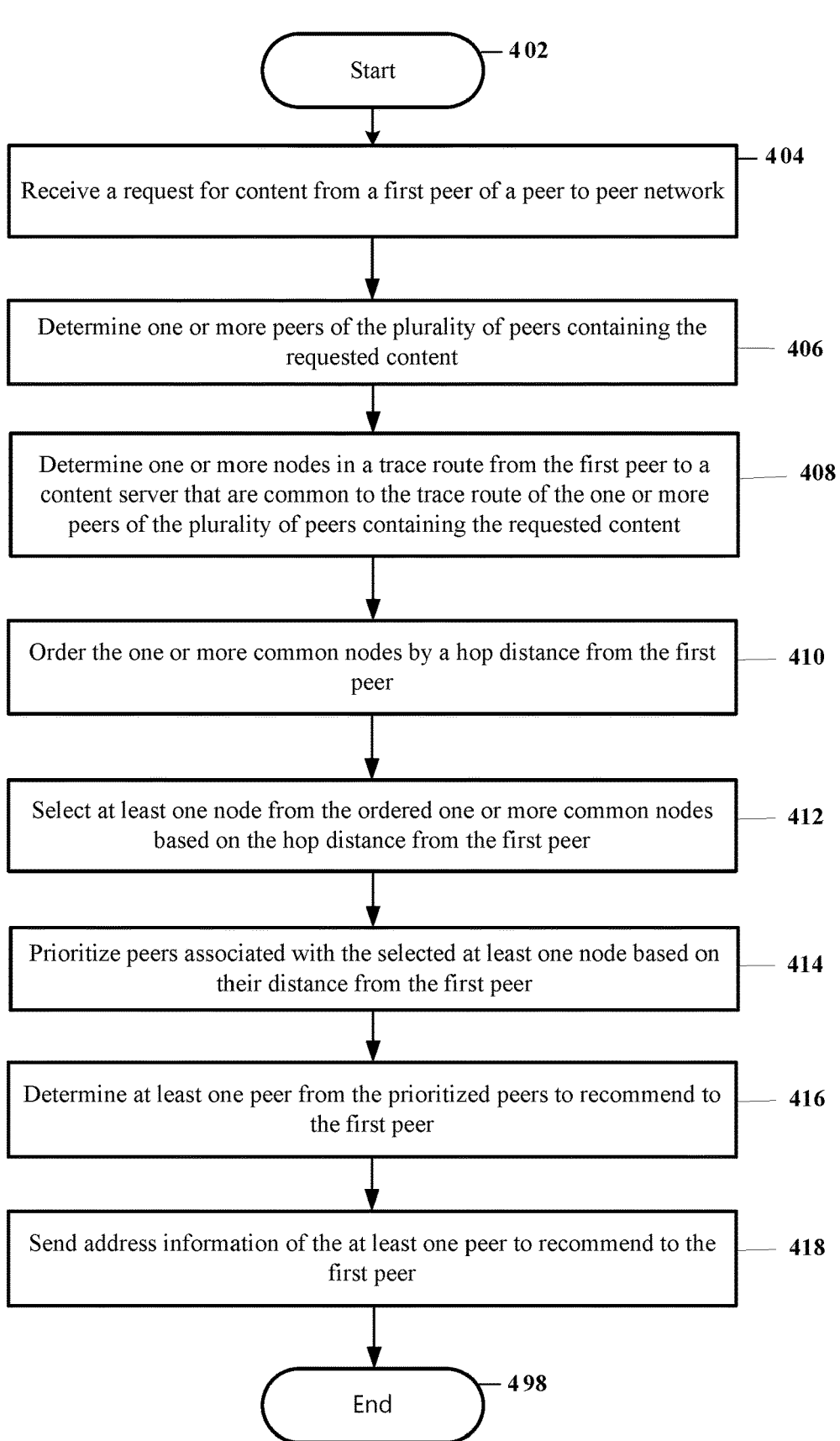
FIG. 4 is a flow chart showing general stages involved in an example method for localizing traffic.

Having described an operating environment and a method of generating network a topology with respect to FIGS. 1-3, FIG. 4 is a flow chart showing general stages involved in an example method 400 for localizing traffic using the network topology. With reference now to FIG. 4, the method 400 may begin at start OPERATION 402 and proceed to OPERATION 404 where a request for content may be received. For example, server 112 may receive the request for content from a first peer 102A of P2P network 100. The first peer 102A may request the content through a P2P application.

After receiving the request for content from the first peer 102A at OPERATION 404, method 400 may proceed to OPERATION 406 where one or more peers 102 that contain the requested content may be determined. For example, peer identifier 114 may determine one or more peers 102 of P2P network 100 that have previously downloaded the requested content. In one aspect, the one or more peers 102 may include only a portion of the requested content. In one aspect, peer identifier 114 may determine one or more peers 102 requesting the content. As a result, peer selection may work both ways. For example, a peer 102 may request other peers 102 who have the content and receive the content or parts of the content. In another example, peers 102 that have the content may request peers 102 that need the content and send content or parts of it. In addition, peers 102 that are in the process of acquiring the content may both send and receive the content to each other.

After determining the one or more peers 102 that contain the requested content at OPERATION 406, method 400 may proceed to OPERATION 408 where one or more nodes in a trace route from the first peer 102A to content server 112 that are common to the trace route of the one or more peers 102 containing the requested content may be determined. For example, peer identifier 114 may perform a look up operation in network topology 300 and determine the one or more nodes that are common between the trace routes. For example, if a request were received from peer A 102A of P2P network 100, and peer B 102B is determined to contain the requested information, peer identifier 114, by performing a look up operation in network topology 300, may determine node 3 to be a common node between peer A 102A and peer B 102B.

After determining the one or more common nodes at OPERATION 408, method 400 may proceed to OPERATION 410 where the determined common nodes may be ordered by a hop distance from the first peer 102A. For example, peer identifier 114 may determine a hop distance between the first peer 102A and the common nodes. Peer identifier 114 then may order the common nodes based on the determined hop distance. In one aspect, peer identifier 114 may order the nodes in an ascending or descending order of the hop distance from the first peer 102A.

After ordering the common nodes at OPERATION 410, method 400 may proceed to OPERATION 412 where at least one node from the ordered common nodes may be shortlisted for recommendation. For example, peer identifier 114 may shortlist a predetermined number of nodes from the common nodes based on the hop distance from the first peer 102A. The predetermined number of nodes to be shortlisted may be determined by a P2P network administrator or the first peer 102A. For example, the predetermined number of nodes to be shortlisted may be limited between one and five nodes. In another example, the predetermined number of nodes to be shortlisted may be limited between two and five hop counts from the first peer 102A. After shortlisting the at least one node at OPERATION 412, method 400 may proceed to OPERATION 414 where peers 102 associated with the shortlisted nodes may be ranked. For example, peer identifier 114 may determine peers 102 associated with each of the shortlisted nodes. Peer identifier 114 then may determine a hop distance of the peers 102 to the first peer 102A. Peer identifier 114 then may rank the peers 102 based on the determined hop distance. Further, peer identifier 114 may assign a priority or a rank to the peers 102 based on the determined hop distance. The priority or the rank may further be assigned based on several other factors. For example, the priority may be assigned based on an availability, reliability, network bandwidth, etc. In one aspect, peer identifier 114 may order the peers 102 in an ascending or descending order of the hop distance from the first peer 102A.

After prioritizing the peers 102 at OPERATION 414, method 400 may proceed to OPERATION 416 where at least one peer 102 may be selected from the ranked peers 102 to recommend to the first peer 102A. For example, peer identifier 114 may select a predetermined number of peers 102 based on the priority or rank associated with the peers 102. In one aspect, the number of peers 102 to be recommended may be limited by server 112 or a user associated with the first peer 102A. After selecting the at least one peer 102 to recommend at OPERATION 416, method 400 may proceed to OPERATION 416 where address information corresponding to the selected at least one peer 102 may be sent to the first peer 102A. In one aspect, peer identifier 114 may anonymize the address information before sending it to the first peer 102A. In another aspect, the first peer 102A may directly contact the recommended peer 102. For example, the first peer 102A may communicate with the recommended peer 102 to set up a data transfer session in which the requested content or a portion of it may be downloaded. In one aspect, server 112 and peer identifier 114 may not be involved in this direct data transfer session. After sending the address information at OPERATION 418, method 400 may end at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
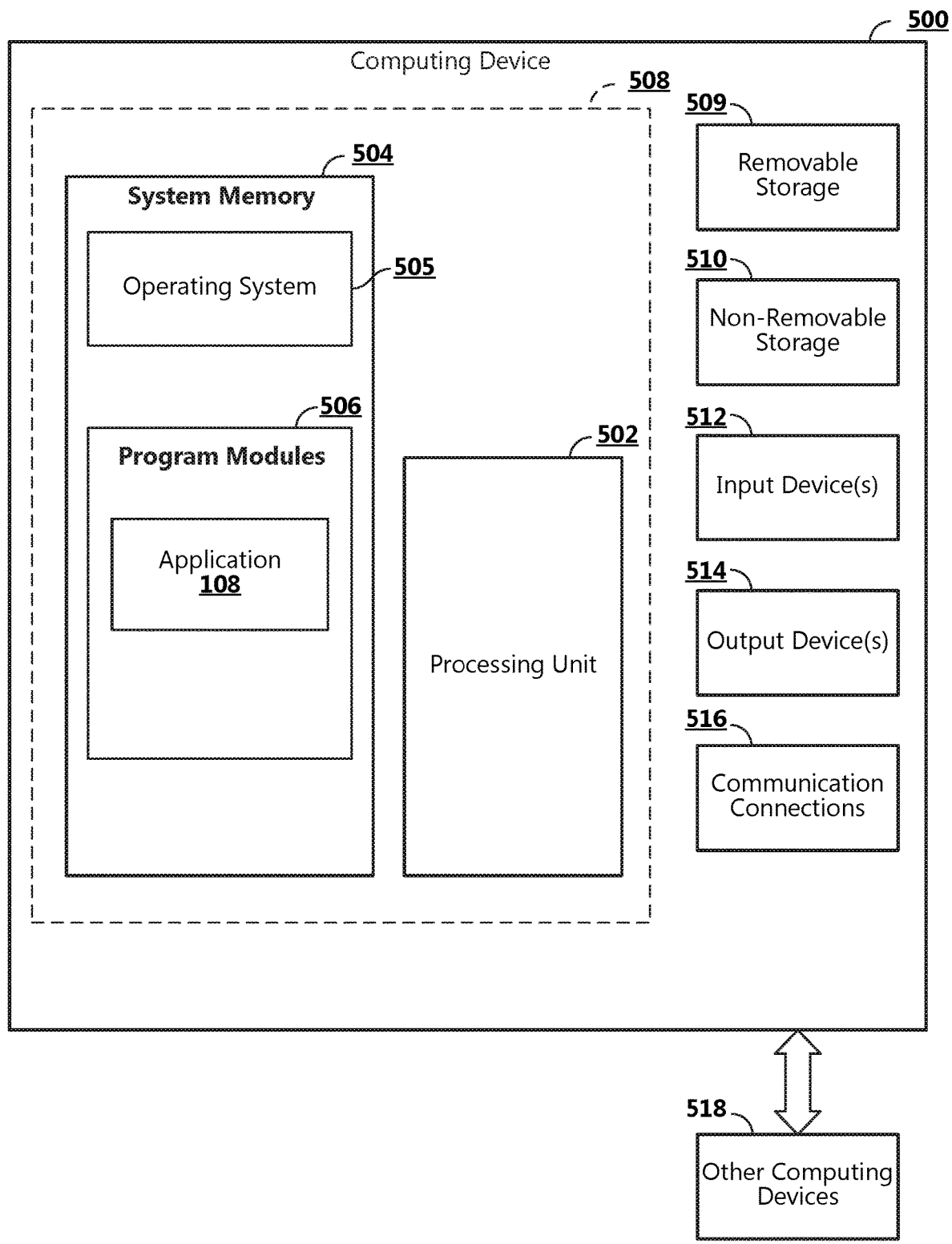
FIG. 5 is a block diagram illustrating example physical components of a computing device.
Figure 6A:
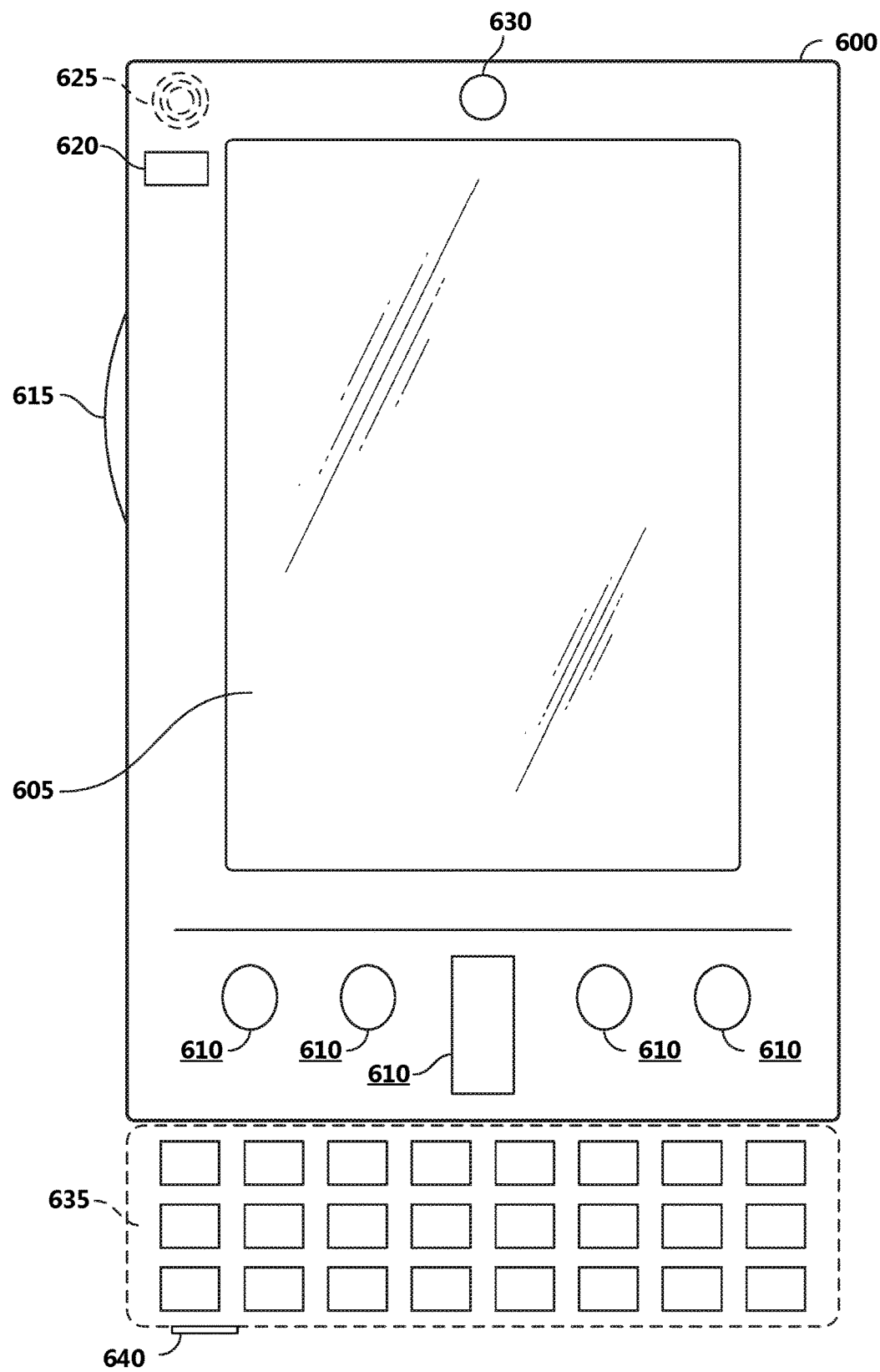
FIGS. 6A and 6B are simplified block diagrams of a mobile computing device.
Figure 6B:
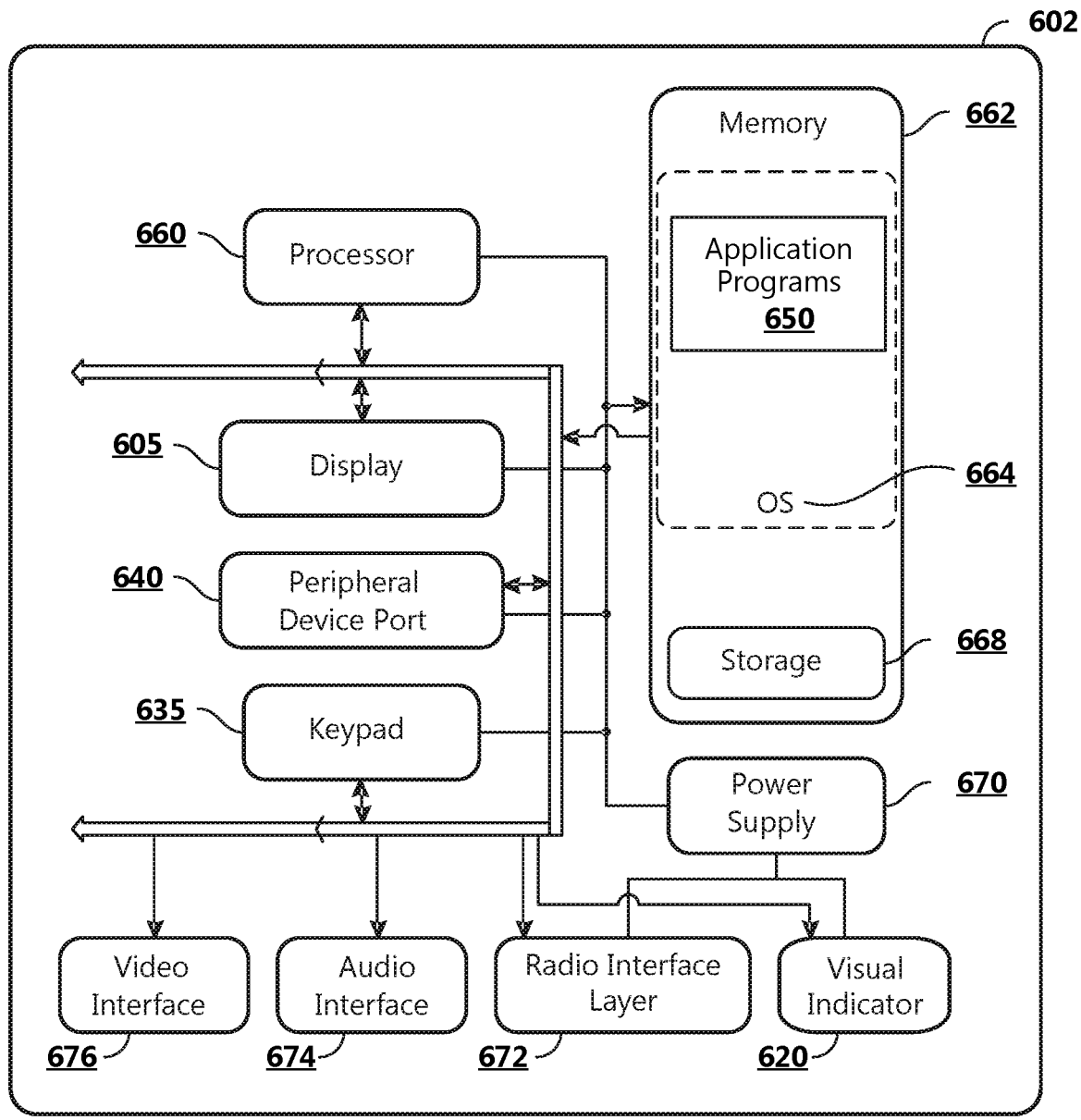
Figure 7:
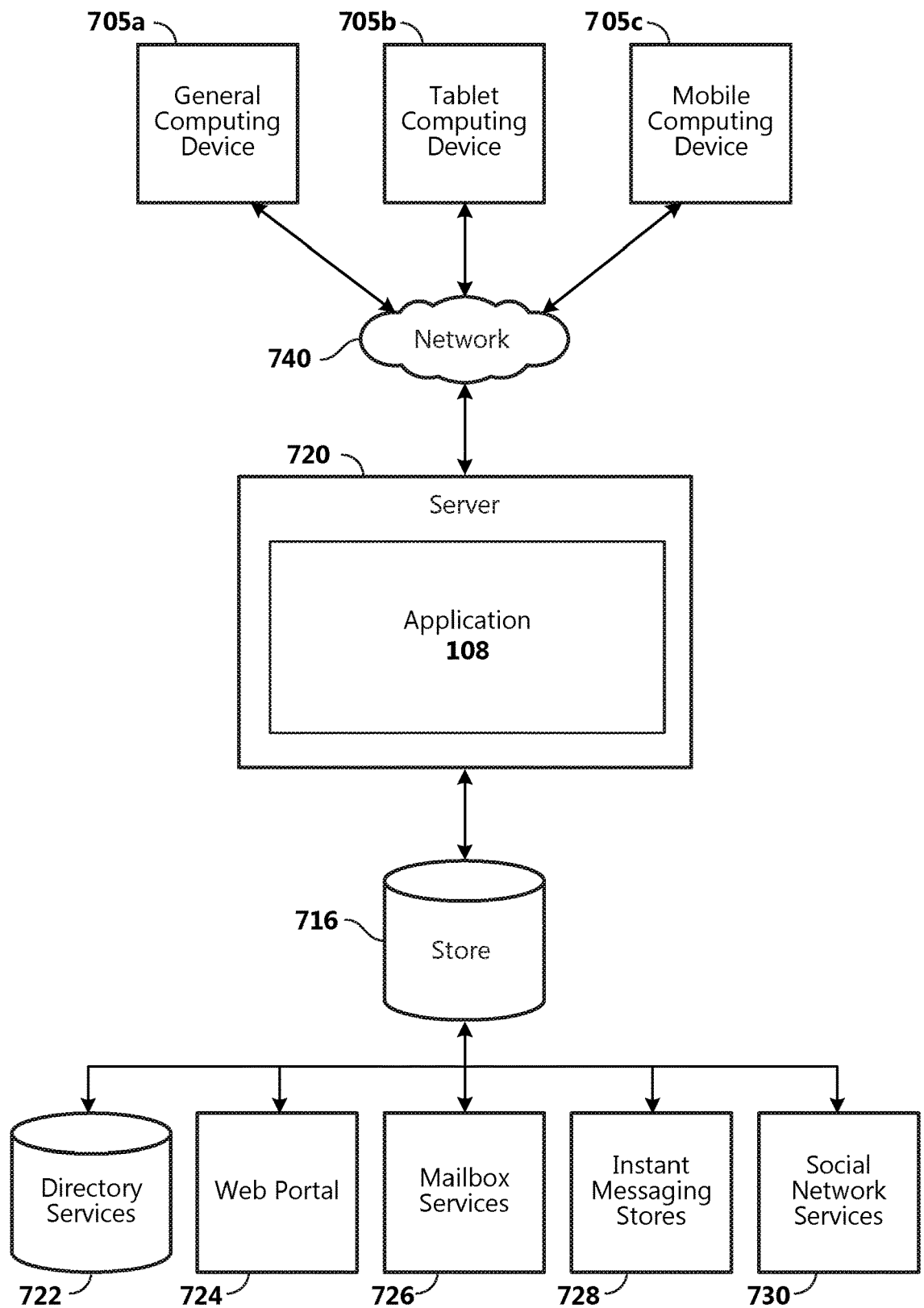
FIG. 7 is a simplified block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, computing device 500 may include at least one processing unit 502 and a system memory 504. According to an aspect, depending on the configuration and type of computing device, system memory 504 may include, but is not limited to, volatile storage (e.g., random access memory), non-volatile storage (e.g., read-only memory), flash memory, or any combination of such memories. According to an aspect, system memory 504 may include an operating system 505 and one or more program modules 506 suitable for running software applications. According to an aspect, system memory 504 may further include a peer to peer application or a peer identifier 114. Operating system 505, for example, is suitable for controlling the operation of computing device 500. Furthermore, aspects may be practiced in conjunction with a graphics library, other operating systems, or any other application program, and is not limited to any particular application or system. This basic configuration is illustrated in FIG. 5 by those components within a dashed line 508. According to an aspect, computing device 500 may include additional features or functionality. For example, according to an aspect, computing device 500 may include additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files may be stored in system memory 504. While executing on the processing unit 502, program modules 506 (e.g., a peer to peer application module or a peer identifier module) perform processes including, but not limited to, one or more of the stages of method 200 illustrated in FIG. 2 and method 400 illustrated in FIG. 4. According to an aspect, other program modules may be used in accordance with examples and include applications such as electronic mail and contacts applications, word processing applications, spreadsheet applications, database applications, slide presentation applications, drawing or computer-aided application programs, etc.

According to an aspect, aspects may be practiced in an electrical circuit comprising discrete electronic elements, packaged or integrated electronic chips containing logic gates, a circuit utilizing a microprocessor, or on a single chip containing electronic elements or microprocessors. For example, aspects may be practiced via a system-on-a-chip (SOC) where each or many of the components illustrated in FIG. 5 may be integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 500 on the single integrated circuit (chip). According to an aspect, aspects of the present disclosure may be practiced using other technologies capable of performing logical operations such as, for example, AND, OR, and NOT, including but not limited to mechanical, optical, fluidic, and quantum technologies. In addition, aspects may be practiced within a general purpose computer or in any other circuits or systems.

According to an aspect, computing device 500 may include one or more input device(s) 512 such as a keyboard, a mouse, a pen, a sound input device, a touch input device, etc. Output device(s) 514 such as a display, speakers, a printer, etc. may also be included according to an aspect. The aforementioned devices are examples and others may be used. According to an aspect, computing device 500 may further include one or more communication connections 516 allowing communications with other computing devices 518. Examples of suitable communication connections 516 may include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. System memory 504, removable storage device 509, and non-removable storage device 510 may be computer storage media examples (i.e., memory storage.) According to an aspect, computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which may be used to store information and which may be accessed by computing device 500. According to an aspect, any such computer storage media may be part of computing device 500. Computer storage media may not include a carrier wave or other propagated data signal.

According to an aspect, communication media may embody computer readable instructions, data structures, program modules, or other data in a modulated data signal, such as a carrier wave or other transport mechanism, and includes any information delivery media. According to an aspect, the term "modulated data signal" may describe a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, mobile computing device 600 may be a handheld computer having both input elements and output elements. Mobile computing device 600 may typically include a display 605 and one or more input buttons 610 that allow the user to enter information into the mobile computing device 600. According to an aspect, display 605 of the mobile computing device 600 functions as an input device (e.g., a touch screen display). If included, an optional side input element 615 may allow further user input. According to an aspect, side input element 615 may be a rotary switch, a button, or any other type of manual input element. In alternative examples, mobile computing device 600 may incorporate more or less input elements. For example, display 605 may not be a touch screen in some examples. In alternative examples, mobile computing device 600 may be a portable phone system, such as a cellular phone. According to an aspect, mobile computing device 600 may include an optional keypad 635. According to an aspect, optional keypad 635 may be a physical keypad. According to another aspect, optional keypad 635 may be a "soft" keypad generated on the touch screen display. In various aspects, the output elements may include display 605 for showing a graphical user interface (GUI), a visual indicator 620 (e.g., a light emitting diode), and/or an audio transducer 625 (e.g., a speaker). In some examples, mobile computing device 600 may incorporate a vibration transducer for providing the user with tactile feedback. In yet another example, mobile computing device 600 may incorporate input and/or output ports, such as an audio input (e.g., a microphone jack), an audio output (e.g., a headphone jack), and a video output (e.g., a HDMI port) for sending signals to or receiving signals from an external device. In yet another example, mobile computing device 600 may incorporate peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, mobile computing device 600 may incorporate a system (i.e., an architecture) 602 to implement some examples. In one example, system 602 may be implemented as a "smart phone" capable of running one or more applications (e.g., browser, e-mail, calendaring, contact managers, messaging clients, games, and media clients/players). In some examples, system 602 may be integrated as a computing device, such as an integrated personal digital assistant (PDA) and wireless phone.

According to an aspect, one or more application programs 650 may be loaded into the memory 662 and run on or in association with the operating system 664. Examples of the application programs may include phone dialer programs, e-mail programs, personal information management (PIM) programs, word processing programs, spreadsheet programs, Internet browser programs, messaging programs, and so forth. According to an aspect, the peer to peer application and a peer identifier application may be loaded into memory 662. System 602 may also include a non-volatile storage area 668 within memory 662. Non-volatile storage area 668 may be used to store persistent information that should not be lost if system 602 is powered down. Application programs 650 may use and store information in non-volatile storage area 668, such as e-mail or other messages used by an e-mail application, and the like. A synchronization application (not shown) may also reside on system 602 and may be programmed to interact with a corresponding synchronization application resident on a host computer to keep the information stored in non-volatile storage area 668 synchronized with corresponding information stored at the host computer. As should be appreciated, other applications may be loaded into memory 662 and run on mobile computing device 600.

According to an aspect, system 602 may include a power supply 670, which may be implemented as one or more batteries. According to an aspect, power supply 670 may further include an external power source, such as an AC adapter or a powered docking cradle that supplements or recharges the batteries.

According to an aspect, system 602 may include a radio 672 that performs the function of transmitting and receiving radio frequency communications. Radio 672 may facilitate wireless connectivity between system 602 and the "outside world," via a communications carrier or service provider. Transmissions to and from radio 672 may be conducted under control of operating system 664. In other words, communications received by radio 672 may be disseminated to application programs 650 via operating system 664, and vice versa.

According to an aspect, visual indicator 620 may be used to provide visual notifications and/or an audio interface 674 is used for producing audible notifications via the audio transducer 625. In the illustrated example, visual indicator 620 may be a light emitting diode (LED) and audio transducer 625 may be a speaker. These devices may be directly coupled to power supply 670 so that when activated, they remain on for a duration dictated by the notification mechanism even though processor 660 and other components might shut down for conserving battery power. The LED may be programmed to remain on indefinitely until the user takes action to indicate the powered-on status of the device. Audio interface 674 may be used to provide audible signals to and receive audible signals from the user. For example, in addition to being coupled to audio transducer 625, audio interface 674 may also be coupled to a microphone to receive audible input, such as to facilitate a telephone conversation. According to an aspect, system 602 may further include a video interface 676 that enables an operation of an on-board camera 630 to record still images, video stream, and the like.

According to an aspect, a mobile computing device 600 implementing system 602 may include additional features or functionality. For example, mobile computing device 600 may include additional data storage devices (removable and/or non-removable) such as, magnetic disks, optical disks, or tape. Such additional storage is illustrated in FIG. 6B by non-volatile storage area 668.

According to an aspect, data/information generated or captured by mobile computing device 600 and stored via system 602 may be stored locally on mobile computing device 600, as described above. According to another aspect, the data may be stored on any number of storage media that is accessible by the device via radio 672 or via a wired connection between mobile computing device 600 and a separate computing device associated with mobile computing device 600, for example, a server computer in a distributed computing network, such as the Internet. As should be appreciated such data/information is accessible via mobile computing device 600 via radio 672 or via a distributed computing network. Similarly, according to an aspect, such data/information may readily be transferred between computing devices for storage and use according to well-known data/information transfer and storage means, including electronic mail and collaborative data/information sharing systems.

FIG. 7 illustrates one example of the architecture of a system for localizing traffic using network topology as described above. Content developed, interacted with, or edited in association with the peer to peer application or the peer identifier may be enabled to be stored in different communication channels or other storage types. For example, various documents may be stored using a directory service 722, a web portal 724, a mailbox service 726, an instant messaging store 728, or a social networking site 730. The P2P application and the peer identifier 114 may be operative to use any of these types of systems or the like for providing for localizing traffic using network topology, as described herein. According to an aspect, a server 720 may localize traffic to clients 705a,b,c. As one example, server 720 may be a web server providing the P2P application over the web. The server 720 may localize traffic over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for localizing network traffic, the method comprising:
    receiving, at a content distribution server, a content request from a first peer of a peer-to-peer (P2P) network comprising a plurality of peers;
    determining one or more target peers of the P2P network that have at least a portion of the requested content;
    determining one or more nodes in a trace route between the first peer and a predetermined address that are common to one or more nodes in trace routes between the one or more target peers and the predetermined address;
    ranking the one or more common nodes based on a hop distance from the first peer;
    selecting, based on the ranked one or more common nodes, at least one target peer to recommend to the first peer for obtaining the requested content; and
    recommending to the first peer the at least one selected peer for establishing a P2P connection.

2. The method of claim 1, wherein determining the one or more nodes in the trace route between the first peer and the predetermined address that are common to the one or more nodes in the trace routes between the one or more target peers and the predetermined address comprises determining the one or more common nodes from a network topology of the P2P network.

3. The method of claim 2, further comprising generating the network topology.

4. The method of claim 3, wherein generating the network topology comprises gathering, for each of the plurality of peers, the trace route, the trace route comprising addresses of nodes in the trace route.

5. The method of claim 4, further comprising categorizing the plurality of peers based on the addresses of the nodes in the trace route.

6. The method of claim 5, wherein categorizing the plurality of peers comprises:
    creating a plurality of buckets, each bucket of the plurality of buckets corresponding to an unique node of the nodes in the trace route; and
    mapping each of the plurality of peers in a bucket corresponding to a node which appears in the trace route.

7. The method of claim 6, wherein creating the plurality of buckets comprises limiting the creation of the plurality of buckets to buckets corresponding to unique nodes that have a hop distance from the plurality of peers that is within a particular range of hop counts.

8. The method of claim 4, wherein gathering the network topology comprising the addresses of the nodes further comprises anonymizing the addresses.

9. The method of claim 1, wherein selecting the at least one target peer to recommend comprises:
ranking the one or more target peers based on a hop distance of each of the one or more target peers from the first peer; and
selecting the at least one target peer further based on the ranking.

10. The method of claim 1, wherein ranking the one or more common nodes based on the hop distance from the first peer comprises determining, for each of the one or more common nodes, the hop distance from the first peer, wherein the hop distance is determined based on at least one of hop count and travel time from the common node to the first peer.

11. The method of claim 1, wherein selecting the at least one target peer to recommend comprises selecting the at least one target peer further based on at least one of availability, reliability, and network bandwidth.

12. The method of claim 1, wherein recommending to the first peer the at least one selected peer for establishing the P2P connection includes providing a network address of the at least one selected peer.

13. A system for localizing traffic using network topology that includes a content distribution server, the system comprising:
at least one processing device; and
at least one computer readable data storage device storing instructions that, when executed by the at least one processing device, cause the system to:
gather network topology for a plurality of devices of a peer to peer (P2P) network;
receive, at the content distribution server, a content request from a first device in the P2P network;
determine, from the network topology, one or more target devices in the P2P network that have at least a portion of the requested content;
determine one or more nodes in a trace route between the first device and a predetermined address that are common to one or more nodes in trace routes between the one or more target devices and the predetermined address;
rank the one or more common nodes based on a hop distance from the first device;
select, based on the ranked one or more common nodes, at least one target device to recommend to the first device for obtaining the requested content; and
recommend to the first device the at least one selected device for establishing a P2P connection.

14. The system of claim 13, wherein the system further includes a peer identifier associated with the content distribution server that gathers the network topology.

15. The system of claim 13, wherein the at least one processing device is further configured to:
create a plurality of buckets, a bucket of the plurality of buckets corresponding to a node; and
map each of the plurality of devices in each bucket corresponding to a node which appears in the trace route.

16. The system of claim 13, wherein the at least one target device to recommend to the first device is selected further based on a hop distance of the at least one target device from the first device and from a common node.

17. The system of claim 13, wherein the predetermined address is one of an address of the content distribution server or an address of a node containing a cached copy of the requested content.

18. The system of claim 13, wherein the content distribution server is not involved in the P2P connection between the first device and the at least one selected device.

19. A computer readable storage device including computer readable instructions, which when executed by a processing unit is operative to:
generate network topology for a plurality of peers of a peer to peer (P2P) network;
receive, at a content distribution server, a content request from a first peer of the P2P network;
determine, from the network topology, one or more target peers that have at least a portion of the requested content;
determine one or more nodes in a trace route between the first peer and a predetermined address that are common to one or more nodes in trace routes between the one or more target peers and the predetermined address;
rank the one or more common nodes based on a hop distance from the first peer;
select, based on the ranked one or more common nodes, at least one target peer to recommend to the first peer for obtaining the requested content; and
recommending to the first peer the at least one selected peer for establishing a P2P connection.

* * * * *